Nov. 9, 1926.
P. HAAS
1,605,939
FLUSHING VALVE MECHANISM
Original Filed March 24, 1925  2 Sheets-Sheet 1
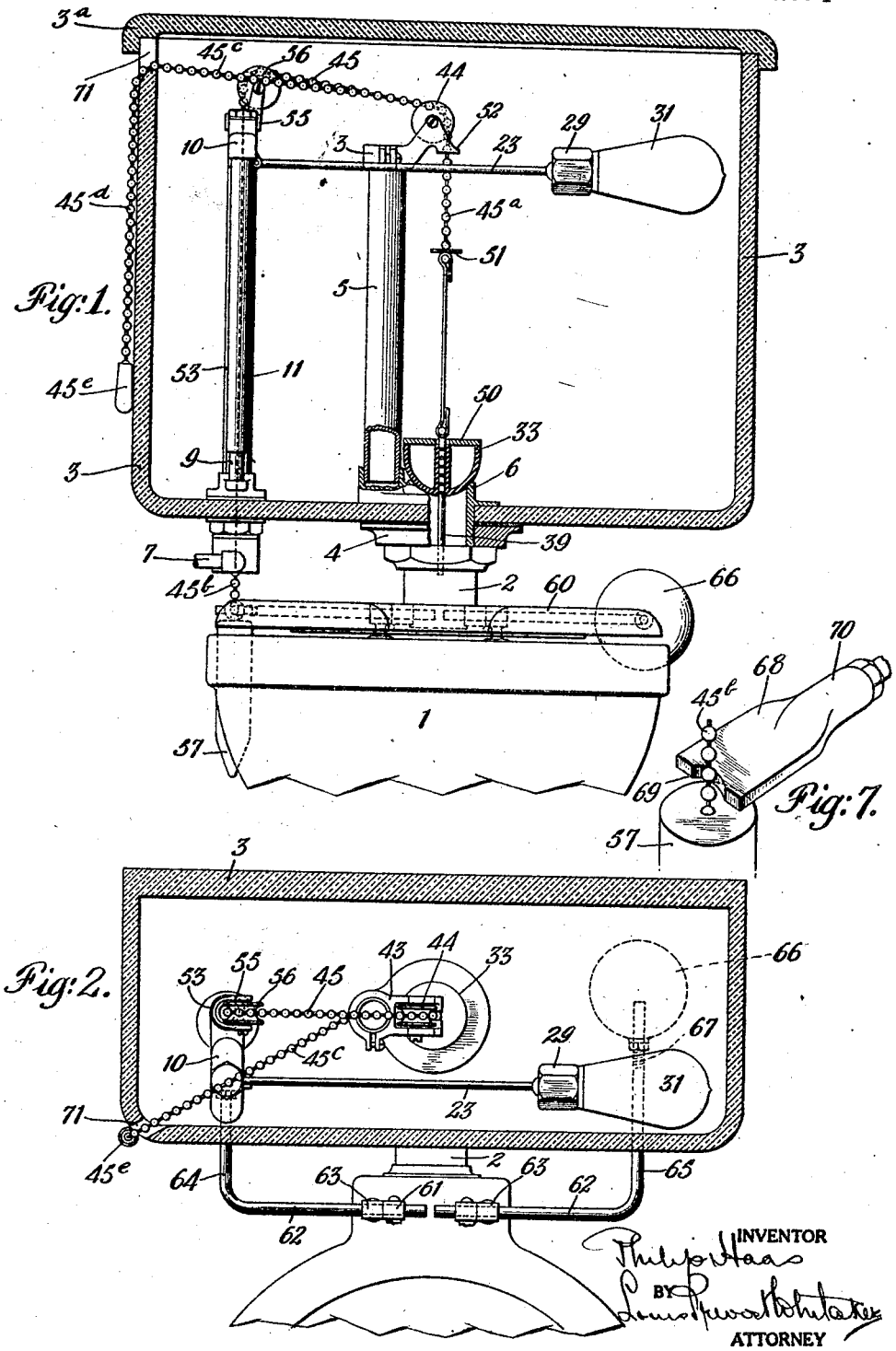

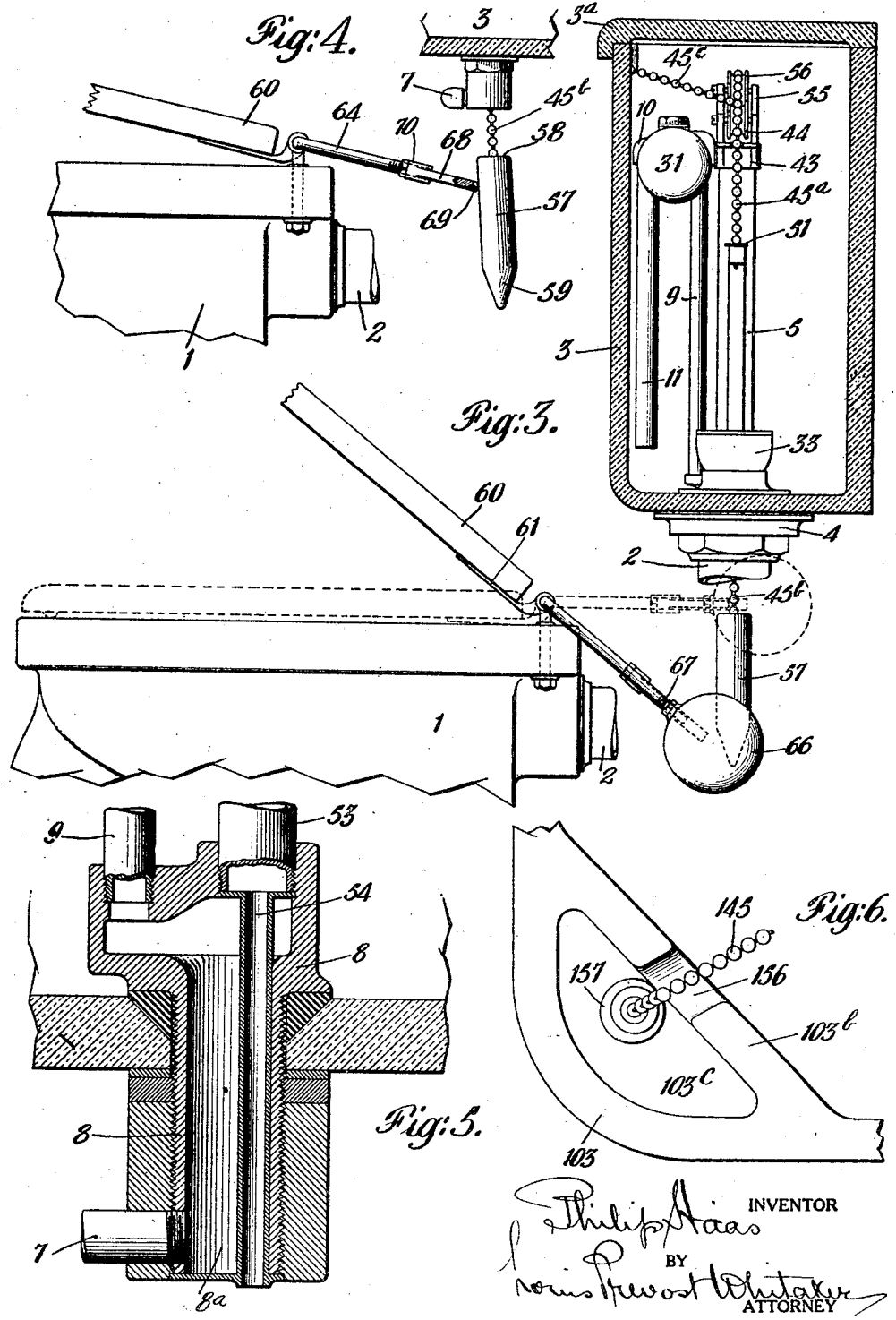

Patented Nov. 9, 1926.

1,605,939

UNITED STATES PATENT OFFICE.

PHILIP HAAS, OF DAYTON, OHIO.

FLUSHING-VALVE MECHANISM.

Application filed March 24, 1925, Serial No. 17,857. Renewed February 19, 1926.

My invention consists in the novel features hereinafter described, reference being had to the accompanying drawings, which illustrate one form in which I have contemplated embodying my invention, and the said invention is fully disclosed in the following description and claims.

The object of my invention is to provide a very simple flushing mechanism for water closets, adapted to be automatically operated by the movements of the seat, and preferably so constructed that it can be operated either by the seat, or independently thereof, or by hand.

Referring to the accompanying drawings,

Fig. 1 is a view, partly in section, showing a flushing apparatus adapted to be operated by the closet seat and also by hand, independently of the seat.

Fig. 2 is a horizontal sectional view through the tank, showing a portion of the closet seat and operating means connected therewith.

Fig. 3 is a side elevation, partly in section, of the apparatus illustrated in Figs. 1 and 2.

Fig. 4 is a detail view, showing the relative positions of the seat actuated operating mechanism when the seat is depressed.

Fig. 5 is an enlarged sectional view showing an arrangement for passing the flushing valve actuating connection through the bottom of the tank.

Fig. 6 is a partial view of a portion of the tank, showing another arrangement for bringing the flushing valve operating mechanism to the outside of the tank.

Fig. 7 is a detail perspective view of the tripping device.

In the accompanying drawings, 1, represents the closet bowl of any usual or preferred construction, with a flushing pipe, 2, connected with a tank, indicated at 3, which may be made of any suitable material, but which is preferably made according to modern methods, of porcelain, and provided with the usual fitting, indicated at 4, for securing it to the flushing pipe, 2, the said fitting being provided with the usual overflow pipe, indicated at 5, and having the usual flushing aperture, surrounded by narrow annular valve seat, here indicated at 6, to engage the flushing valve. 7 represents the water inlet pipe for supplying the tank with water, said pipe being connected with a suitable fitting, indicated at 8, engaging an aperture in the bottom of the tank, and to which a vertical inlet pipe, 9, is connected, provided at its upper end with a float operated inlet valve, the casing of which is indicated at 10, and which controls the discharge of water through the inlet pipes, 7 and 9, to a downwardly extending discharge pipe, 11, in order to minimize the noise of the incoming water. The inlet valve is controlled by a float lever, 23, provided with a float, 31, which is preferably a discarded or burned out incandescent electric lamp supported in a socket, 29, preferably having a universal connection with the lever, 23, and threaded internally so as to receive the threads of the incandescent lamp, the construction being such that the screwing of the lamp into position will secure the universal joint between the socket, 29, and lever, 23, in any position to which the socket may be adjusted so as to enable the float, 31, to be adjusted with respect to the lever in all directions to vary the water level in the tank, and also to accommodate various installations. While I prefer to use an electric lamp bulb as the float, I may use any other suitable form of float provided with the stem for engaging the threads of the socket. The flushing valve, which is indicated at 33, preferably comprises a hollow body having a spherical seat engaging portion to insure making a tight fit, with the seat, regardless of changes in its axial position, said valve being preferably so constructed that it will be filled with water from the surrounding water in the tank in which it is normally submerged when seated. I prefer the hemispherical form of flushing valve herein shown, although a ball or other type of valve may be employed, if desired. The flushing valve, 33, is provided with actuating means, comprising a connection extending from the valve to a point outside of the tank, and including flexible portions, as a cord or chain, and preferably a ball chain composed of connected balls which is very flexible and offers very little frictional resistance. This connection is supported within the tank so as to provide a depending portion, $45^a$, extending vertically from the axis of the valve, 33, and in this instance passing over a groove, guide or roller, preferably of porcelain, 44, supported in a bracket, 43, secured to the top of the overflow pipe, 5, said connection passing over another support and having a depending portion, $45^b$, extending to the exterior of the tank, it being understood that the valve and its operative connections are so constructed as to be in a substantially balanced condition when the valve, 33, is submerged in the water in the tank. The parts hereinbefore described form the subject matter of a separate application for Letters Patent of the United States filed by me on the 24th day of March, 1925, and given Serial No. 17856 and are not specifically claimed herein. As an understanding of their operation is necessary to an understanding of my present invention, I will briefly describe the ordinary operation of the flushing valve. When the exterior depending member of the operative connection, as 45$^b$, is pulled downwardly, the valve, 33, will be raised a certain distance off of its seat, the extent of vertical movement of the valve being preferably limited by means of a stop, or washer, 51, which engages in this instance, a shoulder, 52, on the bracket, 43, the parts being as before stated, in a substantially balanced condition. The valve, 33, will remain in raised position so long as it is submerged in water, which will sustain a portion of the weight of the valve, equivalent to the amount of water displaced thereby. As the water passes out through the flushing aperture to effect the flushing operation, the water level in the tank descends until the valve, 33, is exposed, thereby adding to the weight sustained by the internal depending portion, 45$^a$, of the flexible connection, the additional portion of the weight of the valve formerly supported by the water when the tank was full. When the valve is filled with water, the weight of the contained water is also added. In either case, the weight supported by the interior portion of the connection, 45$^a$, will thus be greater than the weight of the exterior depending portion, and the valve will descend into engagement with its seat, where it will remain while the tank refills with water, restoring the parts to their initial positions and counterbalanced condition.

In order to provide for the operation of the valve automatically by the movements of the seat, it is desirable to have the depending portion, 45$^b$, of the flexible connection pass through the bottom of the tank, although this is not absolutely essential. In order to accomplish this without making an extra hole in the bottom of the tank, for the better accommodation of my improved flushing mechanism to tanks as at present constructed, I prefer to provide the inlet fitting, 8, with a vertically disposed pipe, 53, extending therefrom to a point above the water level, and communicating with a passage, 54, which may be cored in the fitting, or otherwise provided therein, and which passes therethrough to the bottom of the fitting, 8, independent of the water passage, indicated at 8$^a$, which is in communication with the inlet pipe, 7. In this instance I have shown the pipe, 53, provided at its upper end with a bracket, 55, carrying a groove guide or roller, 56, preferably of porcelain, over which the flexible connection, indicated at 45, is passed, and allowed to extend vertically downwardly through the pipe, 53, and passage, 54, to the outside of the tank, below the same, and in a position where it can be conveniently operated by mechanism connected with the seat. The lower end of the depending portion, 45$^b$, of the valve operating connection is provided with a depending enlargement, or boss, 57, preferably of cylindrical form, as shown, and of a diameter considerably larger than the ball chain, 45$^b$, or other flexible connection, to which it is axially connected, the upper portion of the boss, 57, presenting a horizontal annular shoulder, 58, and the lower end being preferably provided with a conical or tapering portion, indicated at 59. In this instance the seat, indicated at 60, is provided with a hinge member, 61, rigidly secured to the hinge pins, 62, which extend through hinge members, 63, secured to the closet bowl, the hinge pins, 62, being extended laterally from the hinge members and being provided with rearwardly extending arms, 64 and 65 respectively. The arm, 65, is provided with a counterbalance weight, indicated at 66, and preferably engaging a screw threaded portion, 67, of the arm, 65, so that it can be adjusted toward and from the axis of the hinge members, to enable it to counterbalance the seat and hold it normally in raised position. The arm, 64, is provided with a tripping member in a form of a flat plate, 68, in a notch, 69, in its rear edge, of substantially the same width as the diameter of the ball chain, 45$^b$, or other flexible connection. The trip arm, 68, is preferably adjustably secured to the arm, 64, being provided with an internally threaded sleeve portion, 70, engaging a threaded portion of the arm, 64, said trip arm and counterbalance weight being held in adjusted positions by set nuts, or screws, or other suitable means. The trip member, 68, is so adjusted that when the seat is depressed into a horizontal position, the trip member will be brought into engagement with the cylindrical portion of the depending lug, 57, and force it rearwardly out of axial alignment with the chain, or flexible connection, 45$^b$, in the manner indicated in Fig. 4, and the parts are so adjusted that when the seat is brought into horizontal position, the trip member, 68, will slip off of the upper edge, or shoulder, 58, of the lug, 57, and the notch, 69, will engage the flexible connection, 45$^b$, as indicated in dotted lines in Fig. 3. This obviously will not affect the flushing valve at all. As soon as the seat is released, the counterbalance weight, 66, will raise it to the normal position, indicated in full lines in Fig. 3, thus causing the trip member, 68, to engage the shoulder, 58, of the lug, 57, and exert a downward pull on the flexible connection, 45ᵇ, sufficient to raise the flushing valve to the desired extent, when it slips off of the shoulder, 58, and releases the valve mechanism. The flushing action immediately commences, the valve remaining in raised position until the lowering of the water level removes the support of the water from the valve, when the valve will gradually descend, seat itself, terminating the flushing operation, and leaving the parts in normal position.

Where a seat operated flushing valve is employed, it is frequently desirable to be able to effect an independent flushing of the bowl without moving the seat, and for this purpose I prefer to provide an auxiliary flexible connection, indicated at 45ᶜ, connected with the substantially horizontal portion, 45, of the main valve operating connection, and extending to the exterior of the tank through a notch, or aperture, in the side or end wall thereof, and having a depending portion, 45ᵈ, provided with a suitable handle, 45ᵉ. In this instance I have shown the tank wall provided at one corner with an open notch, or aperture, preferably with an open notch, indicated at 71, through which the hand operated connection, 45ᶜ, extends, the lateral portions of this notch, or aperture, being flared or rounded so as to minimize friction, and being formed preferably by molding the same in the manufacture of the tank, the bottom of the notch being low enough so that the placing of the lid, 3ᵃ, in position will not interfere with the free running of the chain through the notch or aperture. It will be seen that by this means the flushing action can be brought about at any time independently of the seat, by pulling downwardly on the handle, 45ᵉ, or exterior extending portion, 45ᵈ, of the auxiliary flexible connection, and it will be understood that where both the hand operated and seat operated means are connected, the valve and the depending portion, 45ᵃ, of the flexible connection immediately above the same, will be so constructed as to substantially counterbalance the depending portions, 45ᵇ and 45ᵈ, and their attachments when the valve is submerged. This may be accomplished by suitably weighting the valve, as by means of washers, 50, one of which is illustrated in Fig. 1, but the valve mechanism may be counterbalanced in any convenient or desired manner.

It will be noted that the flushing valve is freely suspended without any guides, and that by reason of its spherical seat engaging portion, it will always make a water tight connection with the seat. I prefer to make the valve out of pure rubber and hollow, as before stated, either in the form of a hemisphere, or cup shaped, or in the form of a ball. I also prefer to provide the valve with a depending stem of much less diameter than the interior of the flushing aperture, said stem extending loosely into the flushing aperture without having any guiding engagement therewith, and merely serving to prevent the valve, 33, from swinging entirely out of alignment with its seat. The stop, 51, for limiting the upward movement of the valve will be so constructed as to arrest the upward movement of the valve before the stem, 39, is raised above the plane of the valve seat, 6.

In Fig. 6 I have illustrated a different arrangement for passing the depending portion, 45ᵇ, of the flexible chain or connection, which is engaged by the seat operated mechanism through the bottom of the tank. In this instance the tank, a portion of which is shown in Fig. 6, at 103, is shown provided at one corner with an interior wall, 103ᵇ, forming a part of the wall of the water compartment, the corner portion of the tank outside of the inner wall, 103ᵇ, being cored vertically, as indicated at 103ᶜ, to provide a vertical passage entirely through the tank and extending through the bottom of the same, separate from the water compartment. In this instance the interior wall, 103ᵇ, is provided with a supporting and guiding notch, 156, the edges of which are rounded or flared to minimize friction, and a portion of the flexible connection, or ball chain, here indicated at 145, extending from the valve to the seat operated boss, indicated at 157 in this figure, lies in the notch, or recess, 156. This construction permits the boss to be swung below the tank in approximately the same position, as shown in the other figures, and the hinge pin and valve operating arm and trip member will be adjusted laterally so as to bring the trip member into proper engagement with the lug, 157, to effect the operations hereinbefore described. Where this construction is employed it will be readily seen that by removing the lid, the ball valve and its flexible connection can be bodily lifted from the tank without disconnecting any part thereof from the other portions when it is desired to replace or repair, or examine the flushing valve.

It will be noted that the construction hereinbefore described is extremely simple and may be readily installed in a tank especially constructed to receive the apparatus, or in a tank of the present construction, and will enable the flushing valve to be operated either by the action of the seat, or by the independent hand operated means, as preferred, and as occasion may require. The apparatus can also be very readily kept in operative condition without the necessity of calling upon skilled labor, as the flushing valve and its connections may be readily removed for repair or replacement of the valve, without even the use of tools.

What I claim and desire to secure by Letters Patent is:

1. In a seat operated flushing mechanism the combination with a pivoted seat, and retracting means therefor for normally holding it in raised position, flushing valve mechanism, and operating means therefor including a freely suspended flexible connection and a shouldered device carried thereby, of a trip arm operatively connected with said seat, normally held out of alignment with said shouldered device but adapted to engage it and pass above the shoulder thereof when the seat is depressed, whereby when the seat is released from its depressed position, said trip arm will draw said shouldered device downward to operate the flushing valve, and will release said shouldered device, before the seat is restored to normal position.

2. In a seat operated flushing mechanism the combination with a pivoted seat, and retracting means therefor for normally holding it in raised position, flushing valve mechanism, and operating means therefor including a freely suspended flexible connection and a shouldered device carried thereby, and located in rear of the pivotal support for the seat, a trip arm secured to said seat and extending rearwardly of its pivotal support, said trip arm being normally held out of alignment with the shouldered device when the seat is raised, but being constructed to engage it and pass above its shouldered portion when the seat is depressed, whereby when the seat is released from its depressed position, said trip arm will draw down upon said shouldered part and operate the flushing valve and will disengage said shouldered part.

3. In a seat operated flushing mechanism the combination with a flushing valve, and means for operating it including a freely suspended flexible connection and a shouldered part carried thereby, of a pivotally mounted seat, a counter-balancing arm rigidly secured thereto and provided with a counter-balance weight for normally holding the seat in raised position, and a trip arm rigidly secured to said seat and extending rearwardly of its pivotal support, said trip arm being normally held out of alignment with said shouldered part when the seat is raised, but constructed to engage said shouldered part and pass above the shoulder thereof when the seat is depressed, whereby the upward movement of the seat, under the action of the counter-balance weight, will operate the flushing valve and move the trip arm out of engagement with said shouldered part.

4. In a seat operated flushing mechanism the combination with a pivoted seat, and retracting means therefor for normally holding it in raised position, flushing valve mechanism, and operating means therefor including a freely suspended flexible connection and a shouldered device carried thereby, of a trip arm operatively connected with said seat, normally held out of alignment with said shouldered device but adapted to engage it and pass above the shoulder thereof when the seat is depressed, whereby when the seat is released from its depressed position, said trip arm will draw said shouldered device downward to operate the flushing valve, and will release said shouldered device, before the seat is restored to normal position, said trip arm being longitudinally adjustable, and laterally adjustable with respect to the seat to enable it to be adjusted with respect to said depending shouldered device.

5. In a seat operated flushing mechanism the combination with a flushing valve, and means for operating it including a freely suspended flexible connection and a shouldered part carried thereby, of a pivotally mounted seat, a counter-balancing arm rigidly secured thereto and provided with a counter-balance weight for normally holding the seat in raised position, and a trip arm rigidly secured to said seat and extending rearwardly of its pivotal support, said trip arm being normally held out of alignment with said shouldered part when the seat is raised, but constructed to engage said shouldered part and pass above the shoulder thereof when the seat is depressed, whereby the upward movement of the seat, under the action of the counter-balance weight, will operate the flushing valve and move the trip arm out of engagement with said shouldered part, said counter-balancing arm and said trip arm being connected each to one of the hinge pins of the seat, said hinge pins being adjustable laterally with respect to the seat, means for adjusting said counter-balance weight longitudinally of its supporting arm and means for adjusting said trip arm longitudinally to adjust it with respect to said depending shouldered device.

6. In combination with a closet bowl provided with a pivoted seat, means for normally and yieldingly holding said seat in raised position, of a flushing tank connected with said bowl and provided with a flushing aperture and valve seat, a valve for engaging said seat, valve operating means, including a flexible connection having a depending portion within the tank and a depending portion exterior thereto provided with a shouldered device, and supporting means connected with the tank and engaging intermediate flexible portions of said connection, the valve and said interior depending portion of said flexible connection substantially balancing the exterior depending portion and said shouldered device, when the valve is submerged, the weight of said valve and interior depending portion of said connection tending to seat the valve when deprived of the support of the water in the tank, and a trip arm on said seat for engaging and passing above said shouldered device when the seat is depressed.

7. In combination with a closet bowl provided with a pivoted seat, means for normally and yieldingly holding said seat in raised position, of a flushing tank connected with said bowl and provided with a flushing aperture and valve seat, a valve for engaging said seat, valve operating means, including a flexible connection having a depending portion within the tank and a depending portion exterior thereto provided with a shouldered device, an auxiliary hand operated depending portion outside of the tank connected to said flexible connection, and supporting means connected with the tank and engaging intermediate flexible portions of said connections, the valve and said interior depending portions of said flexible connection substantially balancing the exterior depending portions, and said shouldered device, when the valve is submerged, the weight of said valve and interior depending portion of said connection tending to seat the valve when deprived of the support of the water in the tank, and a trip arm on said seat for engaging and passing above said shouldered device when the seat is depressed.

In testimony whereof I affix my signature.

PHILIP HAAS.